United States Patent
Shen et al.

(10) Patent No.: US 12,302,149 B2
(45) Date of Patent: May 13, 2025

(54) MEASUREMENT REPORTING METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventors: Jia Shen, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 433 days.

(21) Appl. No.: 17/563,967

(22) Filed: Dec. 28, 2021

(65) Prior Publication Data
US 2022/0124538 A1  Apr. 21, 2022

Related U.S. Application Data

(63) Continuation of application No. PCT/CN2019/096885, filed on Jul. 19, 2019.

(51) Int. Cl.
*H04W 24/10* (2009.01)
*H04B 17/309* (2015.01)

(52) U.S. Cl.
CPC .......... *H04W 24/10* (2013.01); *H04B 17/309* (2015.01)

(58) Field of Classification Search
CPC ... H04W 24/10; H04W 36/005; H04B 17/309
See application file for complete search history.

(56) References Cited

U.S. PATENT DOCUMENTS

| | | | |
|---|---|---|---|
| 2007/0099577 A1 | 5/2007 | Lee et al. | |
| 2015/0304929 A1* | 10/2015 | Hua | H04W 36/324 455/436 |
| 2017/0055273 A1* | 2/2017 | Sharma | H04L 5/006 |
| 2017/0078903 A1* | 3/2017 | Kusashima | H04L 5/0057 |
| 2019/0044633 A1* | 2/2019 | Kobayashi | H04B 17/309 |

(Continued)

FOREIGN PATENT DOCUMENTS

| | | |
|---|---|---|
| CN | 101841827 A | 9/2010 |
| CN | 101945425 A | 1/2011 |

(Continued)

OTHER PUBLICATIONS

Extended European Search Report dated Apr. 28, 2022 received in European Patent Application No. EP19938713.5.

(Continued)

*Primary Examiner* — Jamal Javaid
*Assistant Examiner* — Ryan C Kavleski
(74) *Attorney, Agent, or Firm* — Sheppard, Mullin, Richter & Hampton LLP

(57) ABSTRACT

The present disclosure discloses a measurement reporting method, a terminal device, a network device, a chip, a computer-readable storage medium, a computer program product, and a computer program. The method includes reporting first information and second information. The first information includes a measurement value obtained after the terminal device measures a measurement quantity of a reference signal. The second information indicates a change of the measurement quantity of the reference signal.

12 Claims, 8 Drawing Sheets

(56) References Cited

U.S. PATENT DOCUMENTS

2019/0110300 A1    4/2019  Chen et al.
2019/0260432 A1*   8/2019  Li ......................... H04W 72/23
2020/0259545 A1*   8/2020  Bai ....................... H04W 24/10

FOREIGN PATENT DOCUMENTS

| CN | 109547971 A | 3/2019 |
| GB | 2519002 A | 4/2015 |
| WO | 2004042982 A2 | 5/2004 |
| WO | 2004042982 A3 | 5/2004 |
| WO | 2012044865 A1 | 4/2012 |

OTHER PUBLICATIONS

Huawei et al.: "Discussion on Beam Measurement and Reporting for Beam Management", 3GPP Draft; R4-1807282, 3rd Generation, Partnership Project (3GPP), Mobile Competence Centre; 650, Route Des Lucioles; F-06921 Sophia-Antipolis Cedex; France, vol. RAN WG4, No. 87, Busan, Korea; May 21, 2018-May 25, 2018, May 20, 2018 (May 20, 2018), XP051446873.
International Search Report and Written Opinion dated Apr. 3, 2020 in International Application No. PCT/CN2019/096885. English translation attached.
Communication pursuant to Article 94(3) EPC for European Application 19938713.5 mailed Sep. 14, 2023.

* cited by examiner

| Reporting first information and second information | 21 |

| Receiving first information and second information that are reported by a terminal device | 31 |

MEASUREMENT REPORTING METHOD, NETWORK DEVICE AND TERMINAL DEVICE

CROSS-REFERENCE TO RELATED APPLICATION

The present application is a continuation of International Application No. PCT/CN2019/096885, filed on Jul. 19, 2019, which is incorporated herein by reference in its entirety.

TECHNICAL FIELD

The present disclosure relates to the field of information processing technologies, and more particularly, to a measurement reporting method, a network device, a terminal device, a chip, a computer-readable storage medium, a computer program product, and a computer program.

RELATED ARTS

A 5th-Generation (5G) system can use beam measurement and beam management technologies to find beams that can achieve effective coverage. Based on the beam measurement performed by a terminal device for a network device (i.e., measurement and comparison performed by the terminal device on all beams it can receive), a measurement result is reported to the network device. The network device schedules a beam for the terminal device to access, or the terminal device itself selects an optimal beam to communicate with the network device.

However, when the terminal device is in a mobile state, there may be a problem that a beam with a desirable measurement result at the current moment may be unavailable at the next moment. Therefore, such an approach can neither avoid a sudden drop in a communication rate of the terminal device due to a sudden change in beam strength and quality, nor avoid frequent beam handover and frequent cell handover of the terminal device.

SUMMARY

To solve the above technical problems, embodiments of the present disclosure provide a measurement reporting method, a network device, a terminal device, a chip, a computer-readable storage medium, a computer program product, and a computer program.

In a first aspect, a measurement reporting method is provided. The method is applied in a terminal device. The method includes reporting first information and second information. The first information includes a measurement value obtained after the terminal device measures a measurement quantity of a reference signal. The second information indicates a change of the measurement quantity.

In a second aspect, a measurement reporting method is provided. The method is applied in a network device. The method includes receiving first information and second information that are reported by a terminal device. The first information includes a measurement value obtained after the terminal device measures a measurement quantity of a reference signal. The second information indicates a change of the measurement quantity of the reference signal.

In a third aspect, a terminal device is provided. The terminal device includes a processor and a memory. The memory stores a computer program. The processor is configured to invoke and run the computer program stored in the memory to perform the method in the first aspect or any implementation of the first aspect.

DESCRIPTION OF EMBODIMENTS

In order to facilitate a more detailed understanding of features and technical content of embodiments of the present disclosure, implementations of the embodiments of the present disclosure will be described in detail below with reference to the accompanying drawings. The accompanying drawings are for reference only and are not intended to limit the embodiments of the present disclosure.

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied in various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figures 1, 2, 3:
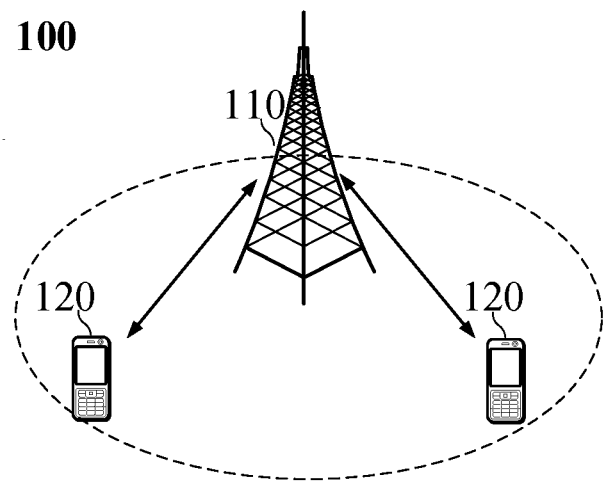
FIG. 1 is a first schematic diagram showing a communication system architecture according to an embodiment of the present disclosure.
FIG. 2 is a first flowchart illustrating a measurement reporting method according to an embodiment of the present disclosure.
FIG. 3 is a second flowchart illustrating a measurement reporting method according to an embodiment of the present disclosure.

Exemplarily, a communication system 100 where an embodiment of the present disclosure is applied can be as illustrated in FIG. 1. The communication system 100 may include a network device 110. The network device 110 may be a device that communicates with a terminal device 120 (or called a communication terminal or a terminal). The network device 110 may provide communication coverage for a specific geographic region, and may communicate with a terminal device located in the coverage region. In at least one embodiment, the network device 110 may be a Base Transceiver Station (BTS) in a GSM system or a CDMA system, a NodeB (NB) in a WCDMA system, an Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage region of the network device 110. The "terminal device" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another terminal device; and/or an Internet of Things (IoT) device. A terminal device configured to communicate through the wireless interface may be referred to as a "wireless communication terminal", a "wireless terminal", or a "mobile terminal".

In at least one embodiment, direct communication, such as Device to Device (D2D) communication, may be performed between the terminal devices 120.

It should be understood that terms "system" and "network" in the present disclosure are often used interchangeably herein. The term "and/or" in the present disclosure only represents an association relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

In order to facilitate a more detailed understanding of features and technical content of embodiments of the present disclosure, implementations of the embodiments of the present disclosure will be described in detail below with reference to the accompanying drawings. The accompanying drawings are for reference only and are not intended to limit the embodiments of the present disclosure.

An embodiment of the present disclosure provides a measurement reporting method, which is applied in a terminal device. As illustrated in FIG. 2, the method includes the following operations.

In block 21, first information and second information are reported.

The first information includes a measurement value obtained after the terminal device measures a measurement quantity of a reference signal.

The second information indicates a change of the measurement quantity of the reference signal.

Correspondingly, an embodiment of the present disclosure also provides a measurement reporting method, which is applied in a network device. As illustrated in FIG. 3, the method includes the following operations.

In block 31, first information and second information that are reported by a terminal device are received.

The first information includes a measurement value obtained after the terminal device measures a measurement quantity of a reference signal.

The second information indicates a change of the measurement quantity of the reference signal.

In this embodiment, the network device may be a base station on a network side, such as an eNB, a Generation Node B (gNB), and the like.

In an embodiment, the change of the measurement quantity of the reference signal in the second information may be determined by obtaining, by the terminal device, the change of the reference signal based on a moving direction and/or a moving speed.

In addition, to determine the change of the measurement quantity of the reference signal, a current position of the terminal device may also be taken into consideration in addition to the above moving direction and/or moving speed. That is, based on a beam or a cell corresponding to the current position of the terminal device along with the moving direction and the moving speed of the terminal device, it is possible to determine a position where the terminal device will be located. Further, the change of the measurement quantity of the reference signal may be obtained based on the position where the terminal device will be located.

The second information may be one of the following two types of information.

Type 1: the second information may include a predicted value of the measurement quantity of the reference signal.

In this case, the first information includes a measurement value obtained after the terminal device measures the measurement quantity of the reference signal at a first time point. The second information indicates a change of the measurement quantity of the reference signal at a second time point. A time interval between the second time point and the first time point is predetermined or is configured by a network side. For example, the first information may correspond to the first time point, and the second information may correspond to the second time point. That is, the first information may include the measurement value of the measurement quantity of the reference signal at the first time point, and the second information may be the predicted value of the measurement quantity of the reference signal at the second time point.

The second time point corresponding to the second information is later than the first time point corresponding to the first information. A first time interval between the second time point corresponding to the second information and the first time point corresponding to the first information is predetermined or is configured by the network side.

When the time interval between the second time point and the first time point is predetermined by the terminal device, the second information may also carry a specific time of the second time point, or the time interval between the second time point and the first time point. Alternatively, the terminal device may notify the network device in advance of the time interval between the second time point and the first time point through other signaling, before transmitting the first information and the second information.

When the time interval between the second time point and the first time point is configured by the network device, the network side may give an indication to the terminal device through Radio Resource Control (RRC), Downlink Control Information (DCI), or Medium Access Control Control Element (MAC CE).

The second time point may mean one or more time points. That is, one or more second time points may exist. The plurality of second time points may be a plurality of absolute times or a plurality of time intervals.

In a case where the second time point means the plurality of time points, the second information includes a plurality of predicted values of a measurement quantity of a reference signal corresponding to the plurality of second time points. There may also be a solution where a plurality of pieces of second information are transmitted, and each piece of second information includes a predicted value of the measurement quantity of the reference signal corresponding to a respective second time point. The plurality of pieces of second information include different time intervals between the respective second time points and the first time point.

When there are the plurality of second time points, the time intervals between the respective second time points and the first time point are configured by the network side for the terminal device, or may be determined by the terminal device itself If there are the plurality of second time points, the time interval between each of the second time points and the first time point configured by the network side can be obtained. For example, suppose that three second time points are configured. Then, the network side can configure, for the terminal device, a time interval between a second time point 1 and the first time point as Δa, a time interval between a second time point 2 and the first time point as Δb, and a time interval between a second time point 3 and the first time point as Δc. Alternatively, only one time interval is configured, and each subsequent second time point uses the same time interval relative to its previous second time point. For example, if the network side only configures Δa for the terminal device, then a time interval between the first second time point and the first time point is Δa, a time interval between the second time point and the first second time point is Δa, and so on. The time interval can be configured for the terminal device through the RRC signaling, or the DCI, or the MAC CE.

When the time intervals related to the plurality of second time points are predetermined by the terminal device, the terminal device may notify the network device of the time intervals through other signaling before transmitting the first information and the second information. Alternatively, when the terminal device reports the second information, the second information may include the plurality of absolute times or time intervals related to the plurality of second time points, and a plurality of predicted values of measurement quantity of the reference signal corresponding to the plurality of second time points (or the plurality of time intervals).

In addition, in this case, a time range covered by the plurality of second time points can be determined based on the moving speed of the terminal device. For example, when the moving speed of the terminal device is fast, the time range covered by the plurality of second time points is short; and when the moving speed of the terminal device is slow, the time range covered by the plurality of second time points is long. The time range covered by the plurality of second time points may be configured by the network device for the terminal device, or may be determined by the terminal device itself If the time range is determined by the network device, the terminal device may report the moving direction and/or the moving speed to the network device in advance, or the network device may determine the moving direction and/or the moving speed of the terminal device based on its monitoring of the terminal device.

A predicted value of the measurement quantity of the reference signal in the second information may be obtained based on a current moving direction and/or moving speed of the terminal device. In addition, the predicted value can also be obtained in combination with a current region or position of the terminal device. The current region of the terminal device may be a current cell where the terminal device is located. The current cell may be determined based on a cell identifier. Or the current position may be determined based on a positioning function of the terminal device. For example, the current position may be obtained based on a Global Positioning System (GPS) module.

Figure 4:
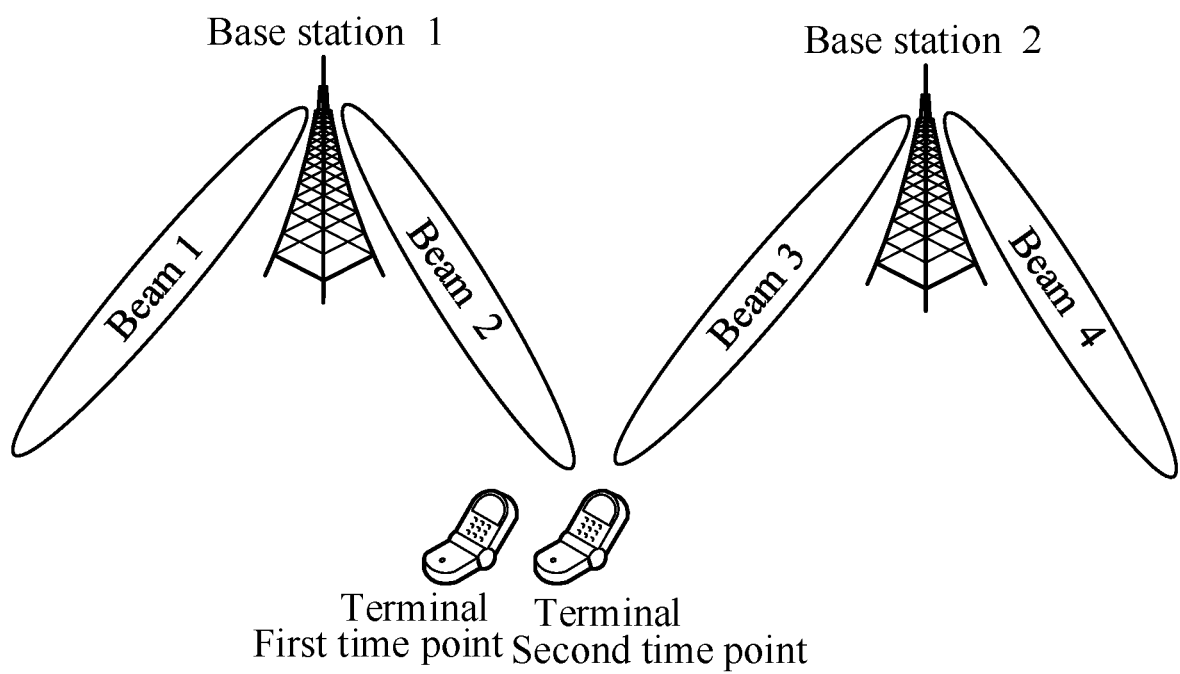
FIGS. 4 to 7 are schematic diagrams showing various scenarios of measurement reporting processing according to an embodiment of the present disclosure.

For example, referring to FIG. 4, when determining the change of the reference signal, the terminal device's measurement value for the measurement quantity of the reference signal at the first time point can be obtained based on the current position of the terminal device, e.g., within a coverage range of a beam 2 of a base station 1. Then, a possible position of the terminal device at the second time point may be predicted in combination with the moving direction and the moving speed of the terminal device. For example, as illustrated in the figure, the terminal device moves towards a base station 2. The terminal device may be located at an edge position of the beam 2 at the second time point. The terminal device's predicted value for the measurement quantity of the reference signal on the beam 2 at the second time point can be predicted based on the edge position.

Figure 5:
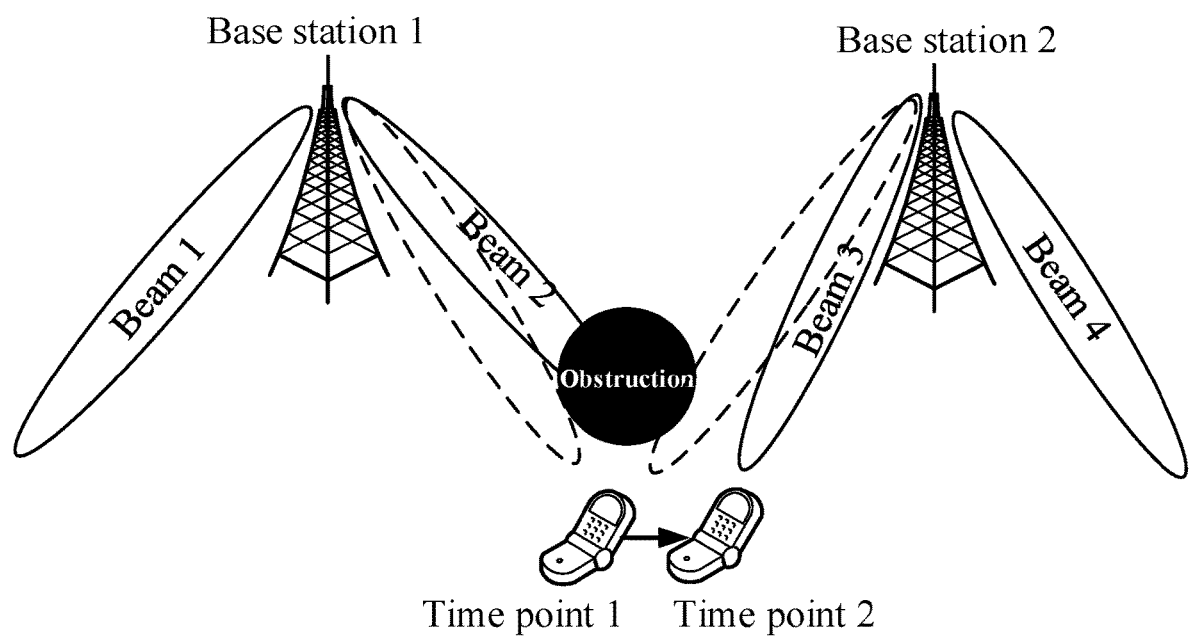

Or, referring to FIG. 5, the terminal device obtains the measurement value of the measurement quantity at a time point 1 (i.e., the first time point). When the terminal device predicts a predicted value at a time point 2 (i.e., the second time point), the reference signal may be blocked from the position of the terminal device by an obstruction at the second time point. The terminal device's predicted value for the measurement quantity of the reference signal at the second time point may be determined based on the obstruction.

Regarding the approach for acquiring a position of the obstruction described above, it may be determined whether there is an obstruction to reception of a corresponding beam by the terminal device at a position where it is located at the second time point, based on a map, e.g., a three-dimensional map, configured in the terminal device. Or, other detection approaches, such as determination based on signal reflection, may be used, which will not be exhaustively listed here.

Type 2: the second information includes change information obtained by predicting a change of the measurement quantity relative to the measurement value.

The change information obtained by predicting the change of the measurement quantity relative to the measurement value includes at least one of an amplitude change value of the measurement quantity, a percentage change of the measurement quantity, a derivative function value of the measurement quantity, and indication information of a change trend of the measurement quantity. The indication information of the change trend may be an indication of an increase or a decrease.

In this approach, a prediction of the change information may be obtained based on a comparison at different time points, or may not be obtained based on the comparison at different time points.

When the prediction of the change information is obtained based on the comparison at different time points, the first information may correspond to the first time point, and the second information may correspond to the second time point. Description of the first time point and the second time point is the same as the above description, and details thereof will be omitted here. After obtaining the terminal device's predicted value of the measurement quantity of the reference signal at the second time point, an absolute value of an amplitude change, or a percentage change of the amplitude, or a derivative function value, or an indication of the change trend may be obtained based on a comparison between the predicted value and the measurement value at the first time point. The approach for obtaining the predicted value is the same as the above approach, and details thereof will be omitted here.

When the prediction of the change information is not obtained based on the comparison at different time points, the change of the measurement quantity of the reference signal can be described by using a derivative (also referred to as the derivative function value), and the change trend can also be indicated through an increase or a decrease. For example, the terminal device can determine, based on the current moving direction and moving speed, that the predicted value of the measurement quantity of the reference signal for a certain beam or cell may increase or decrease. In this case, it is unnecessary to accurately obtain the predicted value, as long as the increase or the decrease of the predicted value of the measurement quantity can be determined. The derivative function value can be a function of the measurement quantity obtained based on a plurality of historical measurement values of the reference signal. Then, the function may be used to determine a corresponding change rate of the measurement value at any time point. The change rate can be determined as a derivative. Or, it is also possible to determine the function of the measurement quantity based on historical measurement values of the measurement quantity, a current measurement value of the measurement quantity, in combination with the predicted value of the measurement quantity, and examples will not be exhaustively listed in this embodiment.

Further, regarding whether the terminal device reports the second information according to this embodiment, it may involve: determining whether the measurement quantity of the reference signal changes; and in response to a change in the measurement quantity, reporting the first information and the second information.

On a basis of the above processing, it is determined whether the predicted value or the change of the measurement quantity of the reference signal changes relative to the measurement value at the first time point.

An approach for determining whether there is a change may be determining: whether the measurement value of the measurement quantity of the reference signal and the predicted value of the measurement quantity of the reference signal are identical to each other; or whether a difference between the measurement value of the measurement quantity of the reference signal and the predicted value of the measurement quantity of the reference signal does not exceed a predetermined threshold; or whether the change of the measurement quantity of the reference signal indicates no change.

A determination approach may specifically be determining whether to report the second information based on the moving speed of the terminal device, or determining whether to predict the change of the measurement quantity of the reference signal based on the moving speed of the terminal device.

For example, when a current moving speed is smaller than a predetermined speed threshold, it can be determined that the terminal device moves slowly, and a value of the measurement quantity of the reference signal will not change significantly within a short period of time. Thus, the second information may not be reported and only the first information may be reported; or the terminal device may not make predictions in this case.

In addition, if the moving speed of the terminal device is not smaller than the predetermined speed threshold, it can be determined that the second information needs to be reported.

Regarding the above scheme, it should also be noted that the first information further includes an identifier of a cell where the terminal device is located or an identifier of a beam covering the terminal device; and/or the second information further includes the identifier of the cell where the terminal device is located or the identifier of the beam covering the terminal device.

Further, the identifier of the cell or the identifier of the beam is used to indicate which cell or beam the reference signal corresponding to the first information and the second information comes from.

The reference signal is at least one of a Synchronization Signal (SS) and a Channel State Information Reference Signal (CSI-RS).

The measurement quantity is at least one of Reference Signal Received Power (RSRP), a Reference Signal Received Quality (RSRQ), and a Signal-to-Interference-plus-Noise Ratio (SINR).

In addition, after receiving the first information and the second information reported by the terminal device, the network device may also be configured to: determine, based on the first information and the second information, whether the terminal device needs to perform handover; and transmit a handover instruction to the terminal device, in response to determining that the terminal device needs to perform handover.

It should be pointed out that the network device starts to make a handover decision in response to receiving the first information and the second information. That is, it can be determined whether to control the terminal device to perform the handover based on both a measurement value currently measured by the terminal device and the change of the reference signal characterized in the second information. In addition, a target cell may be selected to be notified to the terminal device in the handover instruction.

The following describes the solution provided in this embodiment in detail with reference to a few examples.

Figure 6:
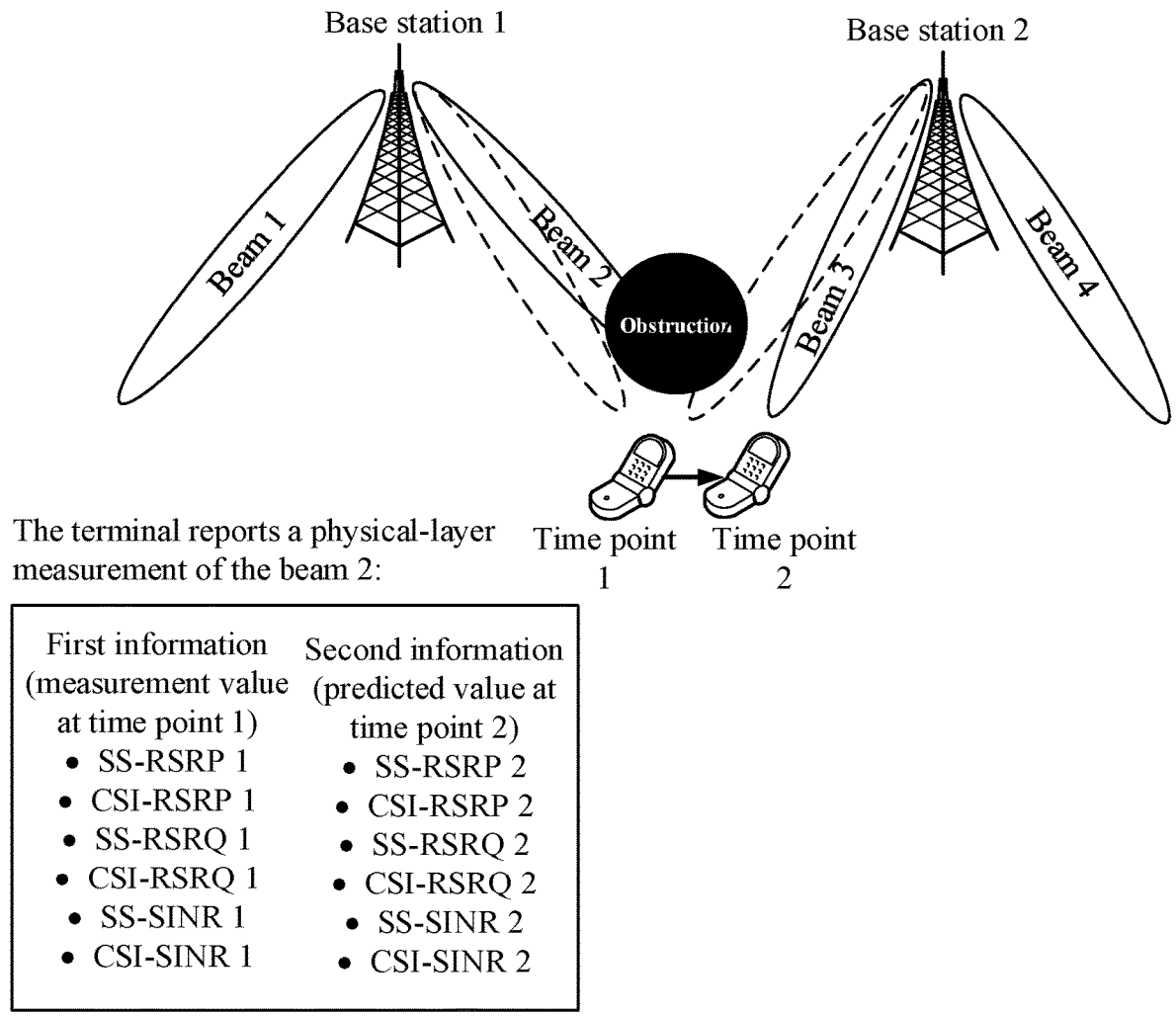

Example 1: the Second Information is the Predicted Value of the Measurement Quantity of the Reference Signal at the Second Time Point As illustrated in FIG. 6, the terminal measures reference signals such as the SS and the CSI-RS on resources configured by the network. Generally, one reference signal resource corresponds to a reference signal in one beam. The measurement value of the reference signal in the reference signal resource reflects signal strength and quality of this beam.

The terminal measures the beam 2 at the time point 1 to form measurement values such as SS-RSRP 1, CSI-RSRP 1, SS-RSRQ 1, CSI-RSRQ 1, SS-SINR 1 and CSI-SINR 1, which are reported through the first information. In addition, the terminal may form, based on a future moving trend (moving direction, moving speed) of the terminal, predicted values such as SS-RSRP 2, CSI-RSRP 2, SS-RSRQ 2, CSI-RSRQ 2, SS-SINR 2 and CSI-SINR 2, at a future time point 2, which are reported through the second information.

As illustrated in FIG. 6, the terminal may predict based on the moving direction and the moving speed of the terminal that at the time point 2, the beam 2 will be blocked and the signal strength and quality will deteriorate. The terminal can form predicted values at the time point 2 accordingly, as illustrated in Table 1. After the network receives the report from the terminal, the network may find that current SS-RSRP, CSI-RSRP, SS-RSRQ, CSI-RSRQ, SS-SINR, CSI-SINR, etc., of the beam 2 are desirable, but may deteriorate significantly at a next time point, and thus the network may determine that a beam 3 instead of the beam 2 should be used to communicate with the terminal.

TABLE 1

| Measurement values at the time point 1 | Predicted values at the time point 2 |
|---|---|
| SS-RSRP 1 = −50 dBm | SS-RSRP 2 = −60 dBm |
| SS-RSRQ 1 = −10 dB | SS-RSRQ 2 = −20 dB |
| SS-SINR 1 = 20 dB | SS-SINR 2 = 0 dB |
| CSI-RSRP 1 = −55 dBm | CSI-RSRP 2 = −65 dBm |
| CSI-RSRQ 1 = −15 dB | CSI-RSRQ 2 = −25 dB |
| CSI-SINR 1 = 15 dB | CSI-SINR 2 = −5 dB |

In this way, the terminal device can not only report the current signal strength and quality, but also predict and report the change trend of the signal based on a future movement of the terminal device. The network can select a beam constantly optimal for a period of time in the future based on the measurement value and the predicted value reported by the terminal to communicate with the terminal, thereby avoiding a sudden drop in the communication rate caused by a sudden change in beam strength and quality, and avoiding frequent beam handover and frequent cell handover.

Figure 7:
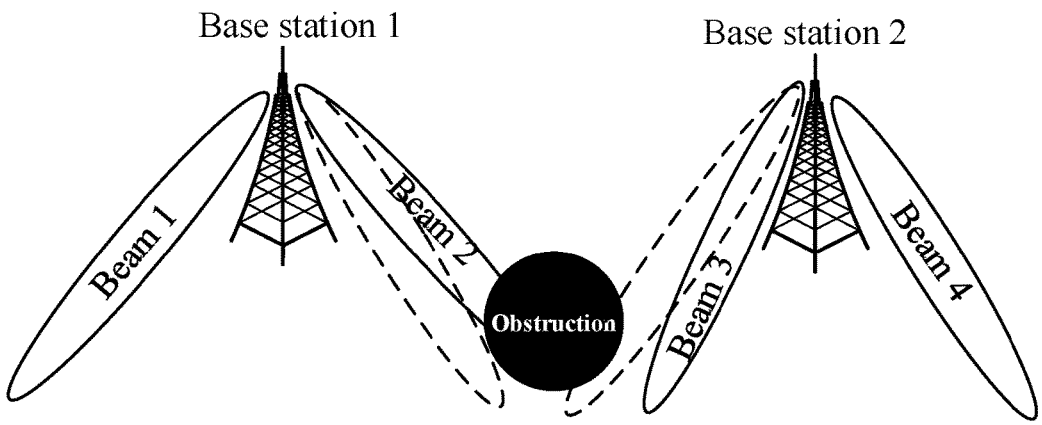

Example 2: the Second Information is a Change Increment of the Measurement Quantity of the Reference Signal at the Second Time Point As illustrated in FIG. 7, the terminal measures the reference signals such as the SS and the CSI-RS on the resources configured by the network. Generally, one reference signal resource corresponds to a reference signal in one beam. The measurement value of the reference signal in the reference signal resource reflects the signal strength and quality of this beam.

The terminal measures the beam 2 at the time point 1 to form measurement values such as the SS-RSRP, the CSI-RSRP, the SS-RSRQ, the CSI-RSRQ, the SS-SINR and the CSI-SINR, which are reported through the first information. Also, the terminal can form, based on the future moving trend (moving direction, moving speed) of the terminal, predictions of change increments of these measurement quantities, such as ΔSS-RSRP, ΔCSI-RSRP, ΔSS-RSRQ, ΔCSI-RSRQ, ΔSS-SINR and ΔCSI-SINR, which are reported through the second information.

As illustrated in FIG. 7, the terminal predicts based on the moving direction and moving speed of the terminal that at the time point 2, the beam 2 will be blocked. The terminal can form predictions of change increment values of these measurement quantities accordingly, as illustrated in Table 2. After receiving the report from the terminal, the network may find that current SS-RSRP, CSI-RSRP, SS-RSRQ, CSI-RSRQ, SS-SINR, CSI-SINR, etc., of the beam 2 are desirable, but may deteriorate significantly at a next time point. The network device can determine at the current time point that the terminal device uses the beam 3 instead of the beam 2 to communicate with the terminal, thereby performing handover.

TABLE 2

| Measurement values at the time point 1 | Change increment values |
|---|---|
| SS-RSRP = −50 dBm | ΔSS-RSRP = −10 dB |
| SS-RSRQ = −10 dB | ΔSS-RSRQ = −10 dB |
| SS-SINR = 20 dB | ΔSS-SINR = −20 dB |
| CSI-RSRP = −55 dBm | ΔCSI-RSRP = −10 dB |
| CSI-RSRQ = −15 dB | ΔCSI-RSRQ = −10 dB |
| CSI-SINR = 15 dB | ΔCSI-SINR = −20 dB |

Another way to express the change increment is to simply express whether the measurement value increases or decreases, as illustrated in Table 3.

TABLE 3

| Measurement values at the time point 1 | Change increment values |
|---|---|
| SS-RSRP = −50 dBm | decrease |
| SS-RSRQ = −10 dB | decrease |
| SS-SINR = 20 dB | decrease |
| CSI-RSRP = −55 dBm | decrease |
| CSI-RSRQ = −15 dB | decrease |
| CSI-SINR = 15 dB | decrease |

In this way, the terminal device can not only report the current signal strength and quality, but also predict and report the change trend of the signal based on a future movement of the terminal device. The network can select a beam constantly optimal for a period of time in the future based on the measurement value and the predicted value reported by the terminal to communicate with the terminal, thereby avoiding a sudden drop in the communication rate caused by a sudden change in beam strength and quality, and avoiding frequent beam handover and frequent cell handover.

Example 3: Report for a Cell or a Beam

Each of the first information and the second information reported in the above examples may be for a certain cell or for a certain beam. As illustrated in the following tables:

TABLE 4

| ID of a cell | Measurement values at the time point 1 | Predicted values at the time point 2 |
|---|---|---|
| Cell ID 1 | SS-RSRP 1 = −50 dBm | SS-RSRP 2 = −60 dBm |
|  | SS-RSRQ 1 = −10 dB | SS-RSRQ 2 = −20 dB |
|  | SS-SINR 1 = 20 dB | SS-SINR 2 = 0 dB |
|  | CSI-RSRP 1 = −55 dBm | CSI-RSRP 2 = −65 dBm |
|  | CSI-RSRQ 1 = −15 dB | CSI-RSRQ 2 = −25 dB |
|  | CSI-SINR 1 = 15 dB | CSI-SINR 2 = −5 dB |

TABLE 5

| ID of a cell | Measurement values at the time point 1 | Change increment values |
|---|---|---|
| Cell ID 1 | SS-RSRP = −50 dBm | ΔSS-RSRP = −10 dB |
|  | SS-RSRQ = −10 dB | ΔSS-RSRQ = −10 dB |
|  | SS-SINR = 20 dB | ΔSS-SINR = −20 dB |

TABLE 5-continued

| ID of a cell | Measurement values at the time point 1 | Change increment values |
|---|---|---|
| | CSI-RSRP = −55 dBm | ΔCSI-RSRP = −10 dB |
| | CSI-RSRQ = −15 dB | ΔCSI-RSRQ = −10 dB |
| | CSI-SINR = 15 dB | ΔCSI-SINR = −20 dB |

TABLE 6

| ID of a cell | Measurement values at the time point 1 | Change increment values |
|---|---|---|
| Cell ID 1 | SS-RSRP = −50 dBm | decrease |
| | SS-RSRQ = −10 dB | decrease |
| | SS-SINR = 20 dB | decrease |
| | CSI-RSRP = −55 dBm | decrease |
| | CSI-RSRQ = −15 dB | decrease |
| | CSI-SINR = 15 dB | decrease |

TABLE 7

| ID of a beam | Measurement values at the time point 1 | Predicted values at the time point 2 |
|---|---|---|
| Beam ID 1 | SS-RSRP 1 = −50 dBm | SS-RSRP 2 = −60 dBm |
| | SS-RSRQ 1 = −10 dB | SS-RSRQ 2 = −20 dB |
| | SS-SINR 1 = 20 dB | SS-SINR 2 = 0 dB |
| | CSI-RSRP 1 = −55 dBm | CSI-RSRP 2 = −65 dBm |
| | CSI-RSRQ 1 = −15 dB | CSI-RSRQ 2 = −25 dB |
| | CSI-SINR 1 = 15 dB | CSI-SINR 2 = −5 dB |

TABLE 8

| ID of a beam | Measurement values at the time point 1 | Change increment values |
|---|---|---|
| Beam ID 1 | SS-RSRP = −50 dBm | ΔSS-RSRP = −10 dB |
| | SS-RSRQ = −10 dB | ΔSS-RSRQ = −10 dB |
| | SS-SINR = 20 dB | ΔSS-SINR = −20 dB |
| | CSI-RSRP = −55 dBm | ΔCSI-RSRP = −10 dB |
| | CSI-RSRQ = −15 dB | ΔCSI-RSRQ = −10 dB |
| | CSI-SINR = 15 dB | ΔCSI-SINR = −20 dB |

TABLE 9

| ID of a beam | Measurement values at the time point 1 | Change increment values |
|---|---|---|
| Beam ID 1 | SS-RSRP = −50 dBm | decrease |
| | SS-RSRQ = −10 dB | decrease |
| | SS-SINR = 20 dB | decrease |
| | CSI-RSRP = −55 dBm | decrease |
| | CSI-RSRQ = −15 dB | decrease |
| | CSI-SINR = 15 dB | decrease |

An analytical comparison with the related art is as follows. In the related art, the terminal device only reports a measurement result of the signal strength and quality of a beam at the current time point. As illustrated in FIG. 4, both the beam 2 and the beam 3 have desirable measurement results, and the network may schedule resources for the terminal in the beam 2 or the beam 3. However, when the terminal is in a mobile state, a beam with a desirable measurement result at the current time point may be blocked by an obstruction at a next time point and thus cannot be used. Therefore, it is necessary to perform beam handover or even cell handover for the terminal. As illustrated in FIG. 5, at a current time point, the beam 2 and the beam 3 are not blocked by the obstruction and can both effectively cover the terminal. The base station may determine to use the beam 2 to communicate with the terminal based on the measurement result reported by the terminal. However, as the terminal moves, a relative positional relationship between the terminal, the base station and the obstacle may change. At the next time point when the terminal arrives at a new position, the beam 2 is blocked, and the network can only hand over the terminal to the beam 3. Since the beam 3 comes from the base station 2, the terminal also needs to perform cell handover. These may cause a sudden drop in the communication rate of the terminal due to a sudden change in the beam strength and quality, as well as frequent beam handover and/or frequent cell handover for communication between the terminal device and the network device.

By adopting the solution provided by this embodiment, the network device can configure resources of the reference signal (such as the SS, the CSI-RS) for the terminal in each beam. The terminal device can measure the SS, the CSI-RS and other reference signals in the configured resources. Then, measurement results of measurement quantities such as the RSRP, the RSRQ and the SINR, i.e., the first information, may be reported to the network. The network can obtain the strength and quality of each beam received by the terminal device, and can also report changes of the measurement quantities such as RSRP, the RSRQ and the SINR to the network device. That is, the second information is reported to the network device. Therefore, the network device can schedule resources for the terminal device in a beam that is optimal at current and in the future, so as to obtain an optimal data communication effect.

That is, according to the embodiment of the present disclosure, the first information and the second information can be reported. The second information indicates, to the network device, a prediction by the terminal device of a future change trend of the measurement quantity of the reference signal. In this way, the network can better schedule a beam for the terminal to form a desirable data communication connection. In addition, since the network side may know the change of the measurement quantity of the reference signal in advance based on the second information, a problem of frequent beam handover and frequent cell handover caused by a sudden change in beam quality can be avoided.

Figure 8:
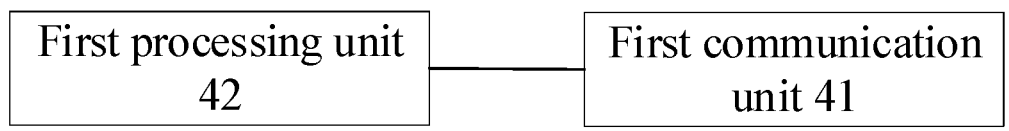
FIG. 8 is a block diagram showing a structure of a terminal device according to an embodiment of the present disclosure.

An embodiment of the present disclosure provides a terminal device. As illustrated in FIG. 8, the terminal device includes a first communication unit 41.

The first communication unit 41 is configured to report first information and second information.

The first information includes a measurement value obtained after the terminal device measures a measurement quantity of a reference signal. The second information indicates a change of the measurement quantity of the reference signal.

Figure 9:
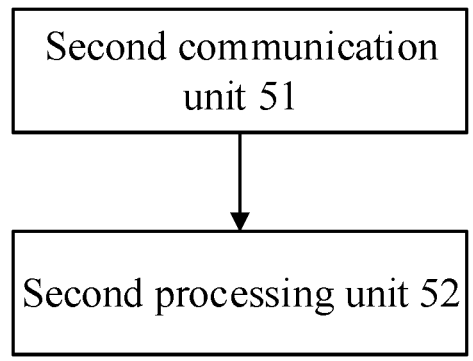
FIG. 9 is a block diagram showing a structure of a network device according to an embodiment of the present disclosure.

Correspondingly, an embodiment of the present disclosure also provides a network device. As illustrated in FIG. 9, the network device includes a second communication unit 51.

The second communication unit 51 is configured to receive first information and second information that are reported by a terminal device.

The first information includes a measurement value obtained after the terminal device measures a measurement quantity of a reference signal. The second information indicates a change of the measurement quantity of the reference signal.

In this embodiment, the network device may be a base station on the network side, such as an eNB, a gNB, and the like.

The terminal device may further include a first processing unit 42. The first processing unit 42 is configured to obtain the change of the reference signal based on the moving direction and/or the moving speed.

The second information may be one of the following two types of information.

Type 1: the second information may include a predicted value of the measurement quantity of the reference signal.

In this case, the first information includes a measurement value obtained after the terminal device measures the measurement quantity of the reference signal at a first time point. The second information indicates a change of the measurement quantity of the reference signal at a second time point. A time interval between the second time point and the first time point is predetermined or is configured by a network side. That is, the first information may correspond to the first time point, and the second information may correspond to the second time point. That is, the first information may include the measurement value of the measurement quantity of the reference signal at the first time point, and the second information may be the predicted value of the measurement quantity of the reference signal at the second time point.

The second time point corresponding to the second information is later than the first time point corresponding to the first information. A first time interval between the second time point corresponding to the second information and the first time point corresponding to the first information is predetermined or is configured by the network side.

When the time interval between the second time point and the first time point is predetermined by the terminal device, the second information may also carry a specific time of the second time point, or the time interval between the second time point and the first time point. Alternatively, the first communication unit 41 of the terminal device may notify the network device of the time interval between the second time point and the first time point through other signaling, before transmitting the first information and the second information.

When the time interval between the second time point and the first time point is configured by the network device, the second communication unit 51 on the network side may give an indication to the terminal device through the RRC, or the DCI, or the MAC CE.

The second time point may mean one or more time points. That is, one or more second time points may exist. When the second time point means the plurality of time points, the second information includes a plurality of predicted values of measurement quantity of the reference signal corresponding to the plurality of second time points.

The plurality of second time points may include a plurality of absolute times or a plurality of time intervals.

Similarly, when there are the plurality of second time points, the time intervals between the respective second time points and the first time point are configured by the network side for the terminal device, or may be determined by the terminal device itself.

When the time intervals are predetermined by the terminal device, the terminal device may notify the network device of the time intervals by means of other signaling and through the first communication unit 41 before transmitting the first information and the second information. Alternatively, when the first communication unit of the terminal device reports the second information, the second information may include the plurality of absolute times or time intervals related to the plurality of second time points, and a plurality of predicted values of measurement quantity of the reference signal corresponding to the plurality of second time points (or the plurality of time intervals).

The first processing unit 42 of the terminal device may obtain a predicted value of a measurement quantity of the reference signal in the second information, based on a current moving direction and/or moving speed. In addition, the predicted value can also be obtained in combination with a current region or position of the terminal device.

Type 2: the second information includes change information obtained by predicting a change of the measurement quantity relative to the measurement value.

The change information obtained by predicting the change of the measurement quantity relative to the measurement value includes at least one of an amplitude change value of the measurement quantity, a percentage change of the measurement quantity, a derivative function value of the measurement quantity, and indication information of a change trend of the measurement quantity.

In this approach, a prediction of the change information may be obtained based on a comparison at different time points, or may not be obtained based on the comparison at different time points.

When the prediction of the change information is obtained based on the comparison at different time points, the first information may correspond to the first time point, and the second information may correspond to the second time point. Description of the first time point and the second time point is the same as the above description, and details thereof will be omitted here. After obtaining the terminal device's predicted value of the measurement quantity of the reference signal at the second time point, the first processing unit 42 of the terminal device may obtain an absolute value of an amplitude change, or a percentage change of the amplitude, or a derivative function value, or an indication of the change trend based on a comparison between the predicted value and the measurement value at the first time point. The approach for obtaining the predicted value is the same as the above approach, and details thereof will be omitted here.

When the prediction of the change information is not obtained based on the comparison at different time points, the first processing unit 42 may describe the change of the measurement quantity of the reference signal by using the derivative function value, and the change trend can also be indicated through an increase or a decrease.

Further, in this embodiment, the following approaches may be used to determine whether the terminal device reports the second information.

Approach 1

The first processing unit 42 of the terminal device is configured to determine whether the measurement quantity of the reference signal changes. When there is no change in the measurement quantity, only the first information is reported through the first communication unit 41.

For example, on a basis of the above processing, if it is determined that the predicted value of the measurement quantity of the reference signal at the second time point does not change relative to the measurement value at the first time point, there is no need to report the second information, thereby saving signaling overhead.

An approach for determining whether there is a change may be determining: whether the predicted value of the measurement quantity of the reference signal at the second time point and the measurement value at the first time point are identical to each other; or whether a difference between the predicted value of the measurement quantity of the reference signal at the second time point and the measurement value at the first time point does not exceed a predetermined threshold.

Approach 2

The first processing unit 42 of the terminal device is configured to determine whether to report the second information based on the moving speed of the terminal device. Alternatively, the first processing unit 42 of the terminal device is configured to determine whether to predict the change of the measurement quantity of the reference signal based on the moving speed of the terminal device.

For example, when the current moving speed is smaller than the predetermined speed threshold, it can be determined that the terminal device moves slowly, and the value of the measurement quantity of the reference signal will not change significantly within a short period of time. Thus, the second information may not be reported and only the first information may be reported; or the terminal device may not make predictions in this case.

If the moving speed of the terminal device is not smaller than the predetermined speed threshold, it can be determined that the second information needs to be reported.

Approach 3

The first communication unit 41 of the terminal device is configured to receive third information carried in the RRC signaling. The third information is used to indicate whether the terminal device reports the second information.

That is, the terminal device may determine whether to report the second information based on the third information carried in the RRC signaling transmitted by the second communication unit 51 of the network device.

The third information can be an indicator bit, which can only be 1 bit. For example, the terminal device can determine to report the second information when the indicator bit is 1, while the terminal device can determine to report no second information when the indicator bit is 0, and vice versa. This is only exemplary and should not be construed as a limitation on specific implementations.

Regarding the above scheme, it should also be noted that the above first information and/or second information may include an identifier of a cell or an identifier of a beam. The identifier of the cell or the identifier of the beam is used to indicate which cell or beam the measurement quantity corresponding to the first information and the second information comes from.

The reference signal is at least one of the SS and the CSI-RS.

The measurement quantity is at least one of the RSRP, the RSRQ, and the SINR.

In addition, after receiving the first information and the second information reported by the terminal device, the network device can also use the second processing unit 52 to determine, based on the first information and the second information, whether the terminal device needs to perform handover. When it is determined that the terminal device needs to perform the handover, the second communication unit 51 is configured to transmit a handover instruction to the terminal device.

According to the embodiment of the present disclosure, the first information and the second information can be reported. The second information indicates, to the network device, a prediction by the terminal device of a future change trend of the measurement quantity of the reference signal. In this way, the network can better schedule a beam for the terminal to form a desirable data communication connection. In addition, since the network side may know the change of the measurement quantity of the reference signal in advance based on the second information, a problem of frequent beam handover and frequent cell handover caused by a sudden change in beam quality can be avoided.

Figure 13:
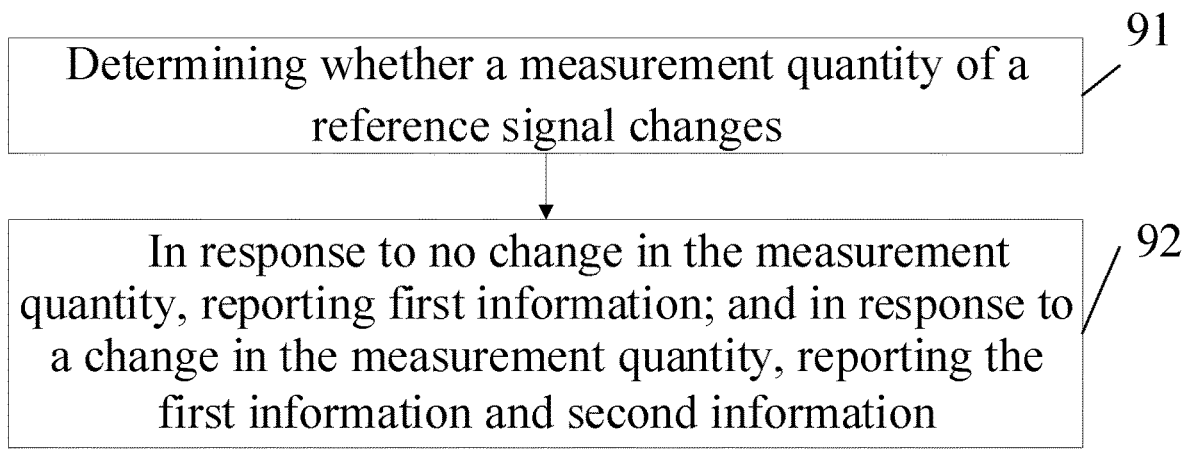
FIG. 13 is a third flowchart illustrating a measurement reporting method according to an embodiment of the present disclosure.

An embodiment of the present disclosure also provides a measurement reporting method, which is applied in a terminal device. As illustrated in FIG. 13, the method may include the following operations.

In block 91, it is determined whether a measurement quantity of a reference signal changes.

In block 92, in response to no change in the measurement quantity, first information is reported; and in response to a change in the measurement quantity, the first information and second information are reported.

The first information includes a measurement value of the measurement quantity obtained after the terminal device measures the reference signal.

The second information indicates a change of the measurement quantity of the reference signal.

The operation of obtaining the first information and the second information and other related processing of the two types of information in this embodiment are the same as those in the above embodiments, and details thereof will be omitted here.

This embodiment differs from the above embodiments in that, on a basis of the above processing, if it is determined that the predicted value or the change of the measurement quantity of the reference signal does not change relative to the measurement value at the first time point, there is no need to report the second information, thereby saving signaling overhead.

An approach for determining whether there is a change may be determining: whether the measurement value of the measurement quantity of the reference signal and the predicted value of the measurement quantity of the reference signal are identical to each other; or whether the difference between the measurement value of the measurement quantity of the reference signal and the predicted value of the measurement quantity of the reference signal does not exceed the predetermined threshold; or whether the change of the measurement quantity of the reference signal indicates no change.

A determination approach may specifically be determining whether to report the second information based on the moving speed of the terminal device, or determining whether to predict the change of the measurement quantity of the reference signal based on the moving speed of the terminal device.

For example, when a current moving speed is smaller than the predetermined speed threshold, it can be determined that the terminal device moves slowly, and the value of the measurement quantity of the reference signal will not change significantly within a short period of time. Thus, the second information may not be reported and only the first information may be reported; or the terminal device may not make predictions in this case.

In addition, if the moving speed of the terminal device is not smaller than the predetermined speed threshold, it can be determined that the second information needs to be reported.

Another approach for determining whether there is a change may be receiving the third information carried in the RRC signaling. The third information indicates whether the terminal device reports the second information.

That is, the terminal device may determine whether to report the second information based on the third information carried in the RRC signaling transmitted by the network device.

The third information can be an indicator bit, which can only be 1 bit. For example, the terminal device can determine to report the second information when the indicator bit is 1, while the terminal device can determine to report no second information when the indicator bit is 0, and vice versa. This is only exemplary and should not be construed as a limitation on specific implementations.

The network device may determine whether to transmit the third information based on at least one of a capability of the terminal device and the moving speed of the terminal device. For example, if the terminal device has a poor processing capability, it can be determined that the terminal device does not support predictive processing, and thus the terminal device can be directly controlled to report no second information.

Alternatively, the network device obtains the moving speed of the terminal device. When the moving speed is smaller than the speed threshold, the terminal device can be controlled to report no second information. The network device can monitor or obtain the moving speed of the terminal device in real time. Once it is detected that the moving speed of the terminal device is not smaller than the speed threshold, the third information can be transmitted through the RRC signaling. The third information instructs the terminal device to report the second information.

An embodiment of the present disclosure also provides a terminal device. As illustrated in FIG. 8, the terminal device includes a first processing unit 42 and a first communication unit 41.

The first processing unit 42 is configured to determine whether a measurement quantity of a reference signal changes; in response to no change in the measurement quantity, report first information; and in response to a change in the measurement quantity, report the first information and second information.

The first communication unit 41 is configured to report the first information, or report the first information and the second information.

The first information includes a measurement value of the measurement quantity obtained after the terminal device measures the reference signal.

The second information indicates a change of the measurement quantity of the reference signal.

The operation of obtaining the first information and the second information and other related processing of the two types of information in this embodiment are the same as those in the above embodiments, and details thereof will be omitted here.

This embodiment differs from the above embodiments in that, on a basis of the above processing, if it is determined that the predicted value or the change of the measurement quantity of the reference signal does not change relative to the measurement value at the first time point, there is no need to report the second information, thereby saving signaling overhead.

An approach for determining whether there is a change may be determining: whether the measurement value of the measurement quantity of the reference signal and the predicted value of the measurement quantity of the reference signal are identical to each other; or whether the difference between the measurement value of the measurement quantity of the reference signal and the predicted value of the measurement quantity of the reference signal does not exceed the predetermined threshold; or whether the change of the measurement quantity of the reference signal indicates no change.

A determination approach may specifically be the first processing unit 42 being configured to determine whether to report the second information based on the moving speed of the terminal device, or determine whether to predict the change of the measurement quantity of the reference signal based on the moving speed of the terminal device.

Another approach may be the first communication unit 41 being configured to receive the third information carried in the RRC signaling. The third information indicates whether the terminal device reports the second information.

That is, the first processing unit of the terminal device may determine whether to report the second information based on the third information carried in the RRC signaling transmitted by the network device.

The third information can be an indicator bit, which can only be 1 bit. For example, the terminal device can determine to report the second information when the indicator bit is 1, while the terminal device can determine to report no second information when the indicator bit is 0, and vice versa. This is only exemplary and should not be construed as a limitation on specific implementations.

According to the embodiment of the present disclosure, the first information and the second information can be reported. The second information indicates, to the network device, a prediction by the terminal device of the future change trend of the measurement quantity of the reference signal. In this way, the network can better schedule a beam for the terminal to form a desirable data communication connection. In addition, since the network side may know the change of the measurement quantity of the reference signal in advance based on the second information, a problem of frequent beam handover and frequent cell handover caused by a sudden change in beam quality can be avoided.

Figure 10:
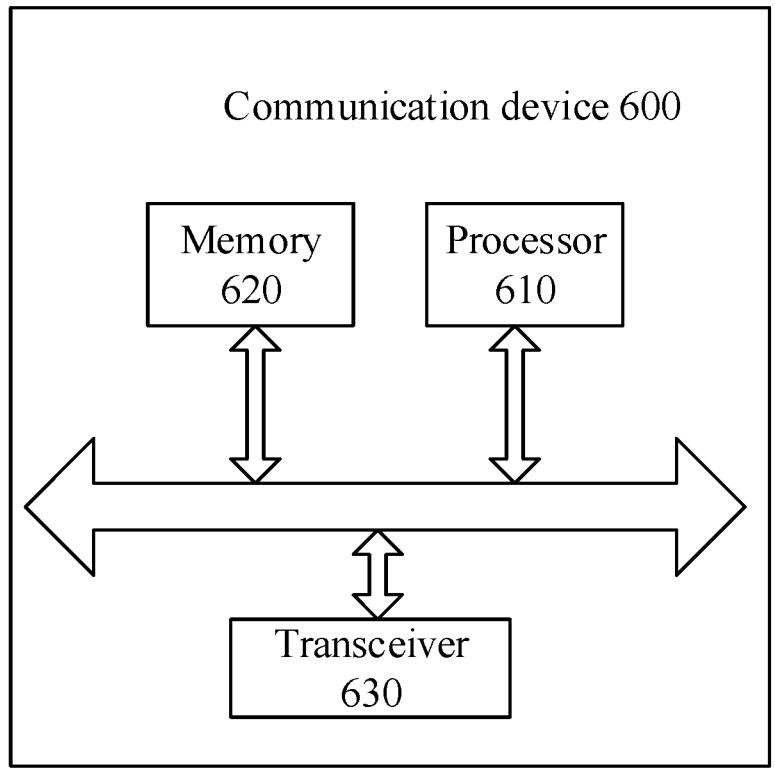
FIG. 10 is a block diagram showing a structure of a communication device according to an embodiment of the present disclosure.

FIG. 10 is a block diagram showing a structure of a communication device 600 according to an embodiment of the present disclosure. Specifically, the communication device in this embodiment can be the network device or the terminal device in the above embodiments. The communication device 600 illustrated in FIG. 10 includes a processor 610. The processor 610 can be configured to invoke and run a computer program from a memory to perform the method according to any of the embodiments of the present disclosure.

In at least one embodiment, as illustrated in FIG. 10, the communication device 600 may further include a memory 620. The processor 610 may invoke and run a computer program from the memory 620 to perform the method according to any of the embodiments of the present disclosure.

Here, the memory 620 may be a separate component independent of the processor 610, or may be integrated in the processor 610.

In at least one embodiment, as illustrated in FIG. 10, the communication device 600 may further include a transceiver 630. The processor 610 may control the transceiver 630 to communicate with other devices, specifically, to transmit information or data to other devices, or receive information or data transmitted by other devices.

Here, the transceiver 630 may include a transmitter and a receiver. The transceiver 630 may further include one or more antennas.

In at least one embodiment, the communication device 600 may specifically be a network device according to an embodiment of the present disclosure. The communication device 600 may execute corresponding processes implemented by the network device in the method according to any of the embodiments of the present disclosure. For brevity, details thereof will be omitted herein.

In at least one embodiment, the communication device 600 may specifically be the terminal device or the network device according to any of the embodiments of the present disclosure. The communication device 600 may implement corresponding processes implemented by the mobile terminal/terminal device in the method according to any of the embodiments of the present disclosure. For brevity, details thereof will be omitted herein.

Figure 11:
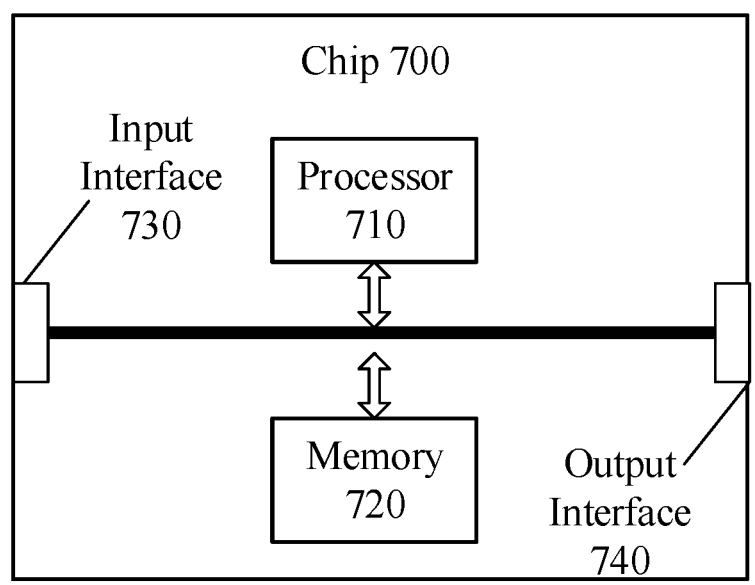
FIG. 11 is a block diagram showing a chip according to an embodiment of the present disclosure.

FIG. 11 is a schematic diagram showing a structure of a chip according to an embodiment of the present disclosure. A chip 700 illustrated in FIG. 11 includes a processor 710. The processor 710 can invoke and run a computer program from a memory to perform the method according to any of the embodiments of the present disclosure.

In at least one embodiment, as illustrated in FIG. 11, the chip 700 may further include a memory 720. The processor 710 may invoke and run a computer program from the memory 720 to perform the method according to any of the embodiments of the present disclosure.

Here, the memory 720 may be a separate component independent of the processor 710, or may be integrated in the processor 710.

In at least one embodiment, the chip 700 may further include an input interface 730. The processor 710 can control the input interface 730 to communicate with other devices or chips, specifically, to obtain information or data transmitted by other devices or chips.

In at least one embodiment, the chip 700 may further include an output interface 740. The processor 710 can control the output interface 740 to communicate with other devices or chips, specifically to output information or data to other devices or chips.

In at least one embodiment, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

It is to be noted that the processor in the embodiment of the present disclosure may be an integrated circuit chip with signal processing capability. In an implementation, the operations of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, operations, and logical block diagrams disclosed in the embodiments of the present disclosure can be implemented or performed. The general purpose processor may be a microprocessor or any conventional processor. The operations of the methods disclosed in the embodiments of the present disclosure may be directly embodied as being performed and completed by a hardware decoding processor, or by a combination of hardware and software modules in the decoding processor. The software modules can be located in a storage medium well known in the related art, such as random access memory, flash memory, read-only memory, programmable read-only memory, electrically erasable programmable memory, or register. The storage medium can be located in the memory, and the processor can read information from the memory and perform the operations of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. By way of illustration rather than limitation, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

Figure 12:
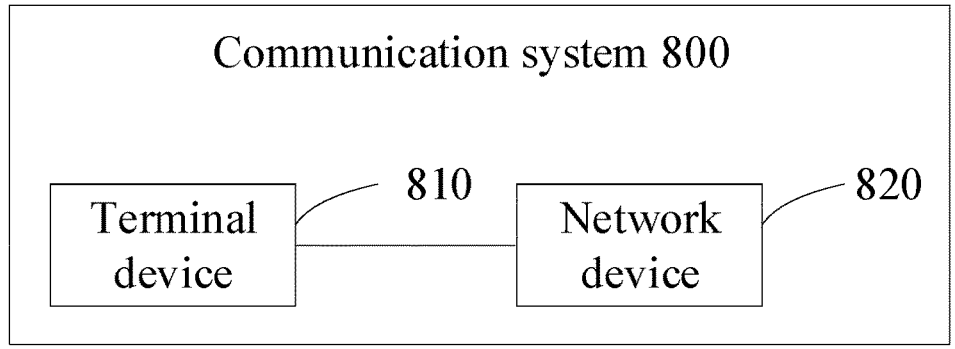
FIG. 12 is a second schematic diagram showing a communication system architecture according to an embodiment of the present disclosure.

FIG. 12 is a schematic block diagram showing a communication system 800 according to an embodiment of the present disclosure. As illustrated in FIG. 12, the communication system 800 may include a terminal device 810 and a network device 820.

Here, the terminal device 810 may be configured to implement corresponding functions implemented by the terminal device in the above method, and the network device 820 may be configured to implement corresponding functions implemented by the network device in the above method. For brevity, details thereof will be omitted herein.

An embodiment of the present disclosure also provides a computer-readable storage medium for storing a computer program.

In at least one embodiment, the computer-readable storage medium can be applied to the network device or the terminal device in the embodiment of the present disclosure, and the computer program can cause a computer to perform corresponding procedures implemented by the network device in the method according to any of the embodiments of the present disclosure. Details thereof will be omitted here for simplicity.

An embodiment of the present disclosure also provides a computer program product including computer program instructions.

In at least one embodiment, the computer program product can be applied to the network device or the terminal device in the embodiment of the present disclosure, and the computer program instructions can cause a computer to perform corresponding procedures implemented by the network device in the method according to any of the embodiments of the present disclosure. Details thereof will be omitted here for simplicity.

An embodiment of the present disclosure also provides a computer program.

In at least one embodiment, the computer program can be applied to the network device or the terminal device in the embodiment of the present disclosure. The computer program, when executed on a computer, can cause the computer to perform corresponding procedures implemented by the network device in the method according to any of the embodiments of the present disclosure. Details thereof will be omitted here for simplicity.

It can be appreciated by those skilled in the art that units and algorithm operations in the examples described in connection with the embodiments disclosed herein can be implemented in electronic hardware or any combination of computer software and electronic hardware. Whether these functions are executed by hardware or software depends on specific applications and design constraints of the technical solutions. Those skilled in the art may use different methods for each specific application to implement the described functions, and such implementation is to be encompassed by the scope of this disclosure.

Those skilled in the art can clearly understand that, for the sake of convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, the technical solutions according to the present disclosure essentially or the part thereof that contributes to the prior art or part of the technical solutions can be embodied in the form of a software product. The computer software product may be stored in a storage medium and contain instructions to enable a computer device, such as a personal computer, a server, or a network device, etc., to perform all or part of the operations of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. A measurement reporting method, applied in a terminal device, the method comprising:
    reporting first information and second information to a network device,
    wherein the first information comprises a measurement value obtained after the terminal device measures a measurement quantity of a reference signal, and
    the second information indicates a change of the measurement quantity,
    wherein the change of the measurement quantity in the second information is determined by the terminal device based on a moving direction and a moving speed of the terminal device,
    the second information indicates that a strength of the measurement quantity will deteriorate, when the terminal device predicts that a beam will be blocked based on the moving direction and the moving speed, and
    the second information comprises change information obtained by predicting a change of the measurement quantity relative to the measurement value,
    predicting and reporting the second information are determined based on the moving speed of the terminal device, wherein the second information is not predicted or reported when the moving speed is smaller than a preset speed threshold, and the second information is predicted and reported when the moving speed is not smaller than the preset speed threshold,
    wherein the first information comprises a measurement value obtained after the terminal device measures the measurement quantity of the reference signal at a first time point, the second information indicates changes of the measurement quantity of the reference signal at a plurality of second time points, and a time range covered by the plurality of second time points is determined based on the moving speed of the terminal device,
    the first information and the second information are used in combination to determine whether the terminal device needs to perform handover, and when the terminal device needs to perform handover, the first and second information are used in combination to indicate a target beam, wherein the target beam is a beam that the terminal device uses to communicate with the network device in a period of time in the future.

2. The method according to claim 1, wherein said change information obtained by predicting the change of the measurement quantity relative to the measurement value comprises at least one of:
    an amplitude change value of the measurement quantity;
    a percentage change of the measurement quantity;
    a derivative function value of the measurement quantity; and
    indication information of a change trend of the measurement quantity.

3. The method according to claim 1, further comprising:
determining whether the measurement quantity of the reference signal changes; and
in response to a change in the measurement quantity, reporting the first information and the second information.

4. A measurement reporting method, applied in a network device, the method comprising:
receiving first information and second information that are reported by a terminal device,
wherein the first information comprises a measurement value obtained after the terminal device measures a measurement quantity of a reference signal, and the second information indicates a change of the measurement quantity of the reference signal,
the change of the measurement quantity in the second information is determined by the terminal device based on a moving direction and a moving speed of the terminal device,
the second information indicates that a strength of the measurement quantity will deteriorate, when the terminal device predicts that a beam will be blocked based on the moving direction and the moving speed, and
the second information comprises change information obtained by predicting a change of the measurement quantity relative to the measurement value,
predicting and reporting the second information are determined based on the moving speed of the terminal device, wherein the second information is not predicted or reported when the moving speed is smaller than a preset speed threshold, and the second information is predicted and reported when the moving speed is not smaller than the preset speed threshold,
wherein the first information comprises a measurement value obtained after the terminal device measures the measurement quantity of the reference signal at a first time point, the second information indicates changes of the measurement quantity of the reference signal at a plurality of second time points, and a time range covered by the plurality of second time points is determined based on the moving speed of the terminal device,
the first information and the second information are used in combination to determine whether the terminal device needs to perform handover, and when the terminal device needs to perform handover, the first and second information are used in combination to indicate a target beam, wherein the target beam is a beam that the terminal device uses to communicate with the network device in a period of time in the future.

5. The method according to claim 4, wherein said change information obtained by predicting the change of the measurement quantity relative to the measurement value comprises at least one of:
an amplitude change value of the measurement quantity;
a percentage change of the measurement quantity;
a derivative function value of the measurement quantity; and
indication information of a change trend of the measurement quantity.

6. The method according to claim 4, further comprising:
configuring for the terminal device a time interval between a second time point corresponding to the second information and a first time point corresponding to the first information.

7. The method according to claim 4, further comprising:
configuring third information for the terminal device through Radio Resource Control (RRC) signaling,
wherein the third information is used to assist the terminal device in determining whether to report the second information.

8. The method according to claim 4, wherein the first information further comprises an identifier of a cell where the terminal device is located or an identifier of a beam covering the terminal device; and/or
the second information further comprises the identifier of the cell where the terminal device is located or the identifier of the beam covering the terminal device.

9. The method according to claim 4, further comprising:
determining, based on the first information and the second information, whether the terminal device needs to perform handover; and
transmitting a handover instruction to the terminal device, in response to determining that the terminal device needs to perform handover.

10. A terminal device, comprising:
a processor; and
a memory,
wherein the memory is configured to store a computer program, and the processor is configured to invoke and run the computer program stored in the memory to perform operations comprising:
reporting first information and second information to a network device,
wherein the first information comprises a measurement value obtained after the terminal device measures a measurement quantity of a reference signal, and
the second information indicates a change of the measurement quantity of the reference signal,
wherein the change of the measurement quantity in the second information is determined by the terminal device based on a moving direction and a moving speed of the terminal device,
the second information indicates that a strength of the measurement quantity will deteriorate, when the terminal device predicts that a beam will be blocked based on the moving direction and the moving speed, and
the second information comprises change information obtained by predicting a change of the measurement quantity relative to the measurement value,
predicting and reporting the second information are determined based on the moving speed of the terminal device, wherein the second information is not predicted or reported when the moving speed is smaller than a preset speed threshold, and the second information is predicted and reported when the moving speed is not smaller than the preset speed threshold,
wherein the first information comprises a measurement value obtained after the terminal device measures the measurement quantity of the reference signal at a first time point, the second information indicates changes of the measurement quantity of the reference signal at a plurality of second time points, and a time range covered by the plurality of second time points is determined based on the moving speed of the terminal device,
the first information and the second information are used in combination to determine whether the terminal device needs to perform handover, and when the terminal device needs to perform handover, the first and second information are used in combination to indicate a target beam, wherein the target beam is a beam that the terminal device uses to communicate with the network device in a period of time in the future.

11. The terminal device according to claim 10, wherein said change information obtained by predicting the change of the measurement quantity relative to the measurement value comprises at least one of:
- an amplitude change value of the measurement quantity;
- a percentage change of the measurement quantity;
- a derivative function value of the measurement quantity; and
- indication information of a change trend of the measurement quantity.

12. The terminal device according to claim 10, wherein the operations further comprise:
- determining whether the measurement quantity of the reference signal changes; and in response to a change in the measurement quantity, reporting the first information and the second information.

* * * * *